Figure 1:
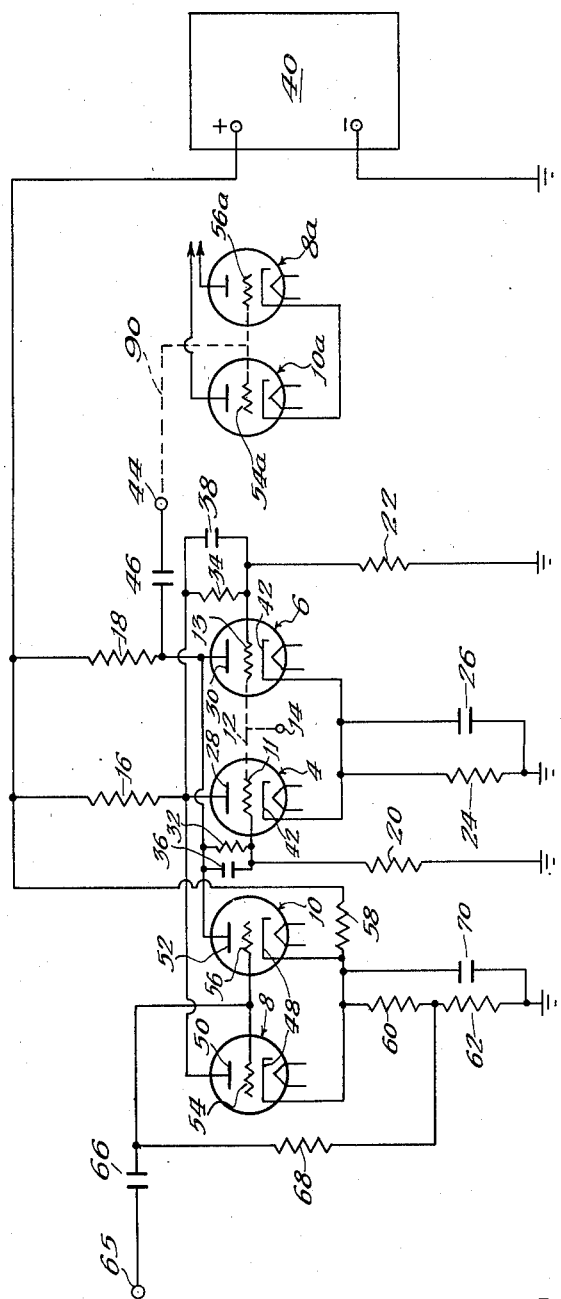

Oct. 3, 1950     W. H. BRADLEY     2,524,692
SCALING CIRCUIT

Filed Aug. 9, 1946     2 Sheets-Sheet 1

Inventor:
Wendell H. Bradley
By: *[signature]*
Attorney

Oct. 3, 1950 W. H. BRADLEY 2,524,692
SCALING CIRCUIT
Filed Aug. 9, 1946 2 Sheets-Sheet 2

Inventor:
Wendell H. Bradley,
By: Robert A Lavender
Attorney:

Patented Oct. 3, 1950

2,524,692

UNITED STATES PATENT OFFICE 2,524,692

SCALING CIRCUIT

Wendell H. Bradley, Chicago, Ill., assignor to United States of America as represented by the United States Atomic Energy Commission Application August 9, 1946, Serial No. 689,479

5 Claims. (Cl. 250—27)

This invention relates to electronic scaling circuits, particularly to scaling circuits as used in the measurement of radioactivity. In the measurement of radioactivity a scaling circuit, also called a scaler, is used to divide the number of pulses obtained from, for example, an alpha-particle pulse ionization chamber by a constant factor called the scaling factor in order to permit the recording of the number of pulses occurring on a mechanical recorder. The scaler is required because in most cases the mechanical recorders cannot operate with sufficient speed. One common form of scaler is the scaler-of-64, which delivers to the mechanical recorder one output pulse for every 64 pulses received at the input.

The most stable and reliable scaling circuit heretofore in use requires that the input pulses be of negative polarity. Such a scaler necessitates the addition of an extra phase-inversion circuit preceding the scaler when the input pulses are positive in polarity.

In counting the pulses from a pulse ionization chamber, it is necessary to use a pulse-height selector circuit preceding the first scaler stage in order to suppress pulses caused by amplifier noise, microphonics and gamma radiation in the ionization chamber, pulses of this nature being smaller in amplitude than the pulses caused by the alpha particles which it is desired to count. A common and convenient form of pulse-height selector is a distorting amplifier, operated so that small input pulses receive small amplification and large input pulses receive large amplification, thus exaggerating the ratio of amplitudes of the desired and undesired pulses. As heretofore used, the distorting amplifier has been capacitance coupled to the first scaler stage. This arrangement has the defect that unless the time constant of the condenser and resistor used for the capacitance coupling is extremely short, thus greatly attenuating the pulses available for actuating the scaler, the operating conditions of the scaler input circuit may change with the number of input pulses.

One object of the present invention is to provide a simple and reliable scaling stage for a scaler, which will operate on input pulses of positive polarity.

Another object of the present invention is to provide a pulse-height selector and first sealing stage wherein the pulse-height selector is direct-coupled to the first scaling stage, without the use of a circuit having a time constant.

Figure 2:
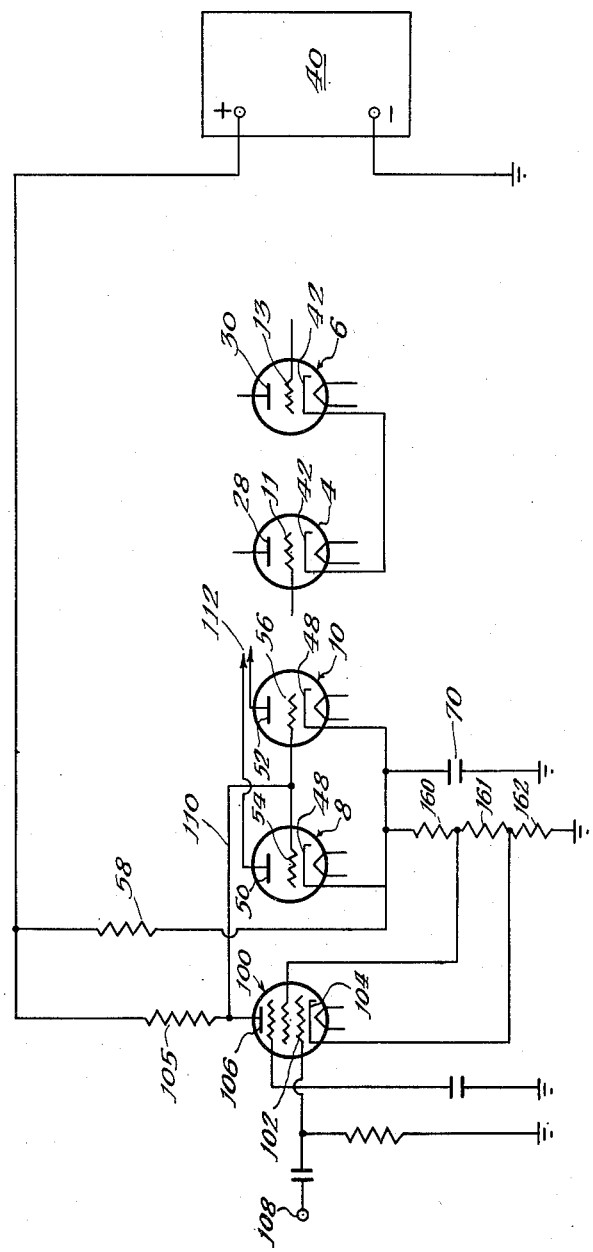

Other aims and objects will appear from the description below and from the drawings, in which:

Figure 1 is a schematic circuit diagram of a scaler stage which operates on positive input pulses; and Figure 2 is a schematic circuit diagram of a pulse-height selector and first scaling stage with certain portions of the latter omitted.

Referring first to Figure 1, triode vacuum tubes 4 and 6 are connected as a trigger pair in the manner to be described below and triode vacuum tubes 8 and 10 are employed as coupling tubes. In order to make clear the operation and advantage of this invention, it will be desirable to first describe the operation of the trigger pair when connected in the usual manner, without the coupling tubes 8 and 10. In such a case, the control grids 11 and 13 are connected together, as shown by dotted line 12, and the input signal is impressed at point 14, and thus directly on grids 11 and 13.

Each of the tubes 4 and 6 has a plate load resistor 16, 18 and a grid resistor 20, 22. The common cathode resistor 24 is by-passed by the cathode by-pass condenser 26. The plate 28, 30 of each tube 4, 6 is connected to the grid 13, 11 of the other tube 4, 6 by the parallel combination of resistor 34, 32 and condenser 38, 36. The circuit is symmetrical, the tubes being of the same type and the corresponding resistors and condensers associated with each tube being of the same values. The circuit has two and only two states of equilibrium, in each of which states of equilbrium one of the tubes is conducting and the other wholly, or substantially, non-conducting. Let it be supposed now that tube 4 is conducting and tube 6 non-conducting. Then plate 28 is at a lower potential than plate 30, which latter plate 30 is substantially at the potential of the positive terminal of the power supply 40. Because of the voltage division between resistors 20 and 32 and between resistors 22 and 34, grid 13 is at a lower potential with respect to common cathodes 42 than is grid 11, this condition of relative grid potentials being identical with the relative conditions of plate current in the assumed state of equilibrium.

A negative pulse impressed at point 14 will produce a relatively negligible effect on tube 6, which it is assumed above is already substantially non-conducting. However, as regards tube 4, the plate 28 becomes more positive, thus impressing a positive pulse on grid 13 through condenser 38. Tube 6 now begins to conduct, and the potential at plate 30 begins to decrease, thus imposing additional negative voltage on grid 11 through condenser 36. The action is thus cumulative and continues till the opposite state of equilibrium has been reached. All of this, of course, occurs in a very short time and not in the discrete steps herein described. As a result of this action, called triggering, there appears at point 44 a negative pulse through condenser 46. The circuit will remain in the same condition until the next appearance of a negative pulse at point 14, when it will again trigger, producing a positive pulse at point 44. Thus for each two negative pulses appearing at input point 14 there appears one negative output pulse and one positive output pulse at output point 44. The negative pulses are said to be "scaled" by a ratio of 2, and the circuit is designated as a scaler-of-2. Since the circuit is relatively insensitive to positive pulses, which affect conduction in both tubes 4 and 6, as opposed to negative pulses, which affect only the tube which is in the conducting stage, the output signal at point 44 may be used as the input to a similar scaling stage, the cascaded stages thus constituting a scaler-of-4. Six such stages so cascaded constitute a scaler-of-64.

The system as above described has been found not to be sufficiently satisfactory from the point of view of accuracy, stability and reliability. In practice, the non-conducting tube is not completely cut off, so that it is not true that it is unaffected by negative pulses. Furthermore the effect of positive pulses is not the same on both tubes, so that it is difficult to make certain that positive pulses of large amplitude will not trigger the circuit. The magnitude of these effects has been found to be sensitive to slight assymmetries and drifts in tubes and circuit components which appear with use and time.

The functioning of the coupling tubes 8 and 10 and associated components in improving the stability and reliability of the circuit may now be explained. Cathodes 48 are connected together. Plate 50 of tube 8 is connected directly to plate 28 of tube 4. Plate 52 of tube 10 is connected directly to plate 30 of tube 6. Grids 54 and 56 are connected together. The voltage dividing network comprising resistors 58, 60 and 62 fixes the potential of cathodes 48 at a value intermediate between the values of potential appearing at plate 28 when tube 4 is conducting and non-conducting respectively. Since the trigger pair is symmetrical the potential of the cathodes 48 is likewise intermediate between the values of potential appearing at plate 30 when tube 6 is conducting and non-conducting respectively. Thus, when tube 4 is conducting and tube 6 non-conducting, plate 52 is positive with respect to cathodes 48, but plate 50 is negative with respect to cathodes 48. Both tubes 8 and 10 are, in the absence of signal, biased beyond cut-off by the potential appearing across resistor 60 of the voltage divider consisting of resistors 58, 60 and 62.

When a positive pulse appears at input point 65, it is impressed upon both grids 54 and 56 and both cathodes 48 by means of coupling condenser 66 and grid resistor 68. Supposing now that tube 4 is conducting and tube 6 non-conducting, such a positive pulse will cause tube 10 to conduct, but will not cause conduction in tube 8 because plate 50 is negative with respect to cathodes 48. Conduction in tube 10 causes a voltage drop across resistor 18 which lowers the potential of plate 30. This negative signal is transmitted by condenser 36 to grid 11, and the trigger pair is triggered in the manner before described. Cathode by-pass condenser 70 is provided to maximize the current flowing through tube 10 during the input pulse, which would otherwise be limited by voltage dividing resistors 60 and 62. It will readily be seen that operation of this scaling trigger pair stage is identical, but reversed, if the existence of the opposite condition of equilibrium in the trigger pair before occurrence of the input pulse at point 64 is assumed.

The scaling trigger pair stage, incorporating coupling tubes 8 and 10 and associated components in the manner illustrated in Figure 1 and described above, gives absolute assurance that the input pulse will be applied only to the grid of the conducting tube of the trigger pair, not to the grid of the non-conducting tube, and the presence of slight conduction in the non-conducting tube will not, as is the case in the absence of coupling tubes, create a condition where the input pulse affects one grid in a manner tending to trigger the circuit and the other grid in a manner tending to oppose such triggering. In addition, the use in the scaling trigger pair stage of the coupling tubes in the manner described fully assures that the trigger pair will not be triggered by pulses of the wrong polarity, since a negative pulse appearing at point 65 will have no effect, both tubes 8 and 10 already being in a cut-off condition in the absence of signal.

As is apparent from the above description, the scaling trigger pair stage illustrated in Figure 1 produces at the output point 44 one positive voltage pulse and one negative voltage pulse for each two positive voltage pulses received at the input 65. If, as shown by dotted connection 90, the signal thus produced is impressed on the grids 54a and 56a of the coupling tubes 8a and 10a of an identical scaling trigger pair stage, shown partially in Figure 1, the combination constitutes two scaler-of-2 stages connected in cascade, or a scaler-of-4. Alternatively, output point 44 may be connected to the input of a scaler-of-2 stage sensitive to negative, rather than positive, pulses. By such an arrangement, a scaler sensitive to negative pulses may be adapted for positive input pulses without the addition of a phase-inverting amplifier stage.

In the circuit illustrated in Figure 2, tube 100 is a pentode amplifier tube. In the absence of signal, the control-grid 102 is at ground potential. The cathode 104 is positive with respect to ground by the amount of voltage appearing across cathode resistor 162 as a result of plate current in the tube 100. Resistor 162 is of sufficiently low value so that the grid bias thus developed is small and tube 100 conducts heavily, inducing a large voltage drop across load resistor 105, thus lowering the potential at the plate 106 to a point where, as is well known in the art, the amplification of the pentode tube 100 for positive or small negative signals appearing at the control-grid 102 is extremely small compared to the amplification for large negative signals. Thus when pulses of varying height and polarity are impressed at the input, only large negative pulses will be appreciably amplified. The distorting amplifier thus acts as a pulse height selector, discriminating against positive pulses and exaggerating the ratio of magnitudes of the negative pulses.

The plate 106 of the distorting amplifier is directly connected by connection 110 to the grids 54 and 56 of the coupling tubes 8 and 10 of the scaler stage described above in connection with Figure 1. Such coupling between the amplifier and the scaling stage, involving no reactive components, and thus introducing no time constant, is known as direct-coupling. In the absence of signal the plate 106 of the amplifier tube 100 and the grids 54, 56 of coupling tubes 8 and 10 are at a potential sufficiently below the potential of cathodes 48 of coupling tubes 8 and 10 to cut off plate current in the latter tubes and to assure that they will not conduct unless the positive pulse appearing at plate 106 as a result of a negative pulse at grid 102 is greater than a predetermined level.

The resistors 160 and 161 of Figure 2 are similar in function to resistors 60 and 62 of Figure 1. In all respects not described above, the circuit of Figure 2 is identical with the circuit of Figure 1. Therefore, in Figure 2, the trigger pair circuit is shown only elementally, connections from the coupling tubes to the trigger pair being indicated by arrows 112.

Equivalents of the embodiments of the invention illustrated in the drawing and described above will be apparent to persons skilled in the art.

What is claimed is:

1. A scaling trigger pair stage comprising, in combination, a first pair of electronic tubes each having a cathode and a plate, means for connecting said pair as a substantially symmetrical trigger pair having a conducting tube and a non-conducting tube, said trigger pair being adapted to be triggered by a negative voltage pulse on the plate of the non-conducting tube and each tube of said pair being connected to a plate load resistor, a second pair of electronic tubes each having a cathode, a plate and a control-grid, the plate of one of the tubes of said second pair being connected directly to the plate of one of the tubes of said first pair and the plate of the other of the tubes of said second pair being connected directly to the plate of the other of the tubes of said first pair, the cathodes of said second pair being directly connected together and the control-grids of said second pair being directly connected together, means for maintaining said cathodes of said second pair at a potential intermediate between the potentials of the plates of the conducting and non-conducting tubes of said first pair, and means for maintaining the potential of said control-grids of said second pair sufficiently negative with respect to the potential of said cathodes of said second pair to cut off conduction in both of the tubes of said second pair in the absence of a signal, so that only a positive voltage pulse upon the control-grids of said second pair causes conduction in said pair, said conduction being only in the tube of said second pair the plate of which is connected to the plate of the non-conducting tube of said first pair, and said pulse has no effect upon the other tube of said second pair regardless of the magnitude of the pulse.

2. Scaling apparatus comprising, in combination, an electronic amplifier circuit which includes an electronic amplifier tube having a plate and a plate load resistor and a control electrode, whereby the potential of the plate varies in accordance with the potential of the control electrode, a first pair of electronic tubes each having a cathode and a plate, means for connecting said pair as a substantially symmetrical trigger pair having a conducting tube and a non-conducting tube, said trigger pair being adapted to be triggered by a negative voltage pulse on the plate of the non-conducting tube and each tube of said pair being connected to a plate load resistor, and a second pair of electronic tubes each having a cathode, a plate and a control-grid, the plate of one of the tubes of said second pair being connected directly to the plate of one of the tubes of said first pair and the plate of the other of the tubes of said second pair being connected directly to the plate of the other of the tubes of said first pair, the cathodes of said second pair being directly connected together and the control-grids of said second pair being directly connected together, means for maintaining said cathodes of said second pair at a potential intermediate between the potentials of the plates of the conducting and non-conducting tubes of said first pair, a direct connection connecting said control-grids of said second pair directly to said plate of said amplifier tube, and means for maintaining the last said plate, in the absence of signal, at a potential sufficiently negative with respect to the potential of said cathodes of said second pair to cut off conduction in both of the tubes of said second pair, so that only a positive voltage pulse upon the control-grids of said second pair causes conduction in said pair, said conduction being only in the tube of said second pair, the plate of which is connected to the plate of the non-conducting tube of the first pair, and said pulse has no effect upon the other tube of said second pair regardless of the magnitude of the pulse.

3. Scaler apparatus comprising, in combination, a plurality of scaling trigger pair stages as described in claim 1, and means to connect said stages in cascade.

4. Scaler apparatus comprising, in combination, a plurality of scaling trigger pair stages, and means to connect said stages in cascade, the first of said scaling trigger pair stages in such cascade being as described in claim 1.

5. A scaling trigger pair stage comprising, in combination, a first pair of electronic tubes each having a cathode and a plate, means for connecting said pair as a substantially symmetrical trigger pair having a conducting tube and a non-conducting tube, said trigger pair being adapted to be triggered by a negative voltage pulse on the plate of the non-conducting tube and each tube of said pair being connected to a plate load resistor, a second pair of electronic tubes each having a cathode, a plate and a control-grid, the plate of one of the tubes of said second pair being connected directly to the plate of one of the tubes of said first pair and the plate of the other of the tubes of said second pair being connected directly to the plate of the other of the tubes of said first pair, the cathodes of said second pair being directly connected together and the control-grids of said second pair being directly connected together, a resistor connected between the high voltage side of the plate load resistors of the trigger pair and the cathodes of the second pair, and a second resistor connected to said cathodes and in series with the plate-to-cathode circuit of the second pair, and means for maintaining the potential of said control grids of said second pair sufficiently negative with respect to the potential of said cathodes of said second pair to cut off conduction in both of the tubes of said second pair in the absence of a signal, so that only a positive voltage pulse upon the control-grids of said second pair causes conduction in said pair, said conduction being only in the tube of said second pair, the plate of which is connected to the plate of the non-conducting tube of the first pair, and said pulse has no effect upon the other tube of said second pair regardless of the magnitude of the pulse.

WENDELL H. BRADLEY.

REFERENCES CITED

The following references are of record in the file of this patent:

UNITED STATES PATENTS

| Number | Name | Date |
|---|---|---|
| 2,366,357 | Schlesinger | Jan. 2, 1945 |
| 2,410,703 | Berkoff et al. | Nov. 5, 1946 |
| 2,418,521 | Morton et al. | Apr. 8, 1947 |
| 2,431,335 | Langmuir | Nov. 25, 1947 |

OTHER REFERENCES

Proc. Camb. Philo. Soc., vol. 33, 1937, "A Scale of Two High Speed Counter Using Hard Vacuum Triodes" by Lewis, pages 549–558.

Review of Scientific Instruments, vol. 8, Nov. 1937, "A Vacuum Tube Circuit for Scaling Down Counting Rates" by Stevenson et al., pages 414–416.

Electrical Counting, 1943 by Lewis, pages 71–76, The Macmillan Company.